United States Patent [19]

Tamamura

[11] Patent Number: 5,572,268
[45] Date of Patent: Nov. 5, 1996

[54] CAMERA WITH RETRACTABLE MAGNETIC HEAD AND RETRACTABLE PAD

[75] Inventor: Hideo Tamamura, Kanagawa-ken, Japan

[73] Assignee: Canon Kabushiki Kaisha, Tokyo, Japan

[21] Appl. No.: 432,523

[22] Filed: May 1, 1995

Related U.S. Application Data

[63] Continuation of Ser. No. 141,681, Oct. 26, 1993, abandoned, which is a continuation of Ser. No. 867,312, Apr. 10, 1992, abandoned, which is a continuation of Ser. No. 633,997, Dec. 26, 1990, abandoned.

[30] Foreign Application Priority Data

Dec. 28, 1989 [JP] Japan .................................. 1-338457
Apr. 18, 1990 [JP] Japan .................................. 2-102325
Jun. 29, 1990 [JP] Japan .................................. 2-170093

[51] Int. Cl.⁶ .................................. G03B 17/24
[52] U.S. Cl. .................................. 396/319; 396/320
[58] Field of Search .................................. 354/105, 106, 354/173.1, 173.11, 212

[56] References Cited

U.S. PATENT DOCUMENTS 2,535,498 12/1950 Kornei .................................. 360/118
4,642,717 2/1987 Matsuda et al. .................................. 360/105
4,834,306 5/1989 Robertson et al. .................................. 242/71.1
4,841,319 6/1989 Hansen .................................. 354/275
4,864,332 9/1989 Harvey .................................. 354/21
5,016,030 5/1991 Dwyer et al. .................................. 354/21

FOREIGN PATENT DOCUMENTS 0078911 5/1983 European Pat. Off. .
0169032 1/1986 European Pat. Off. .
0267749 5/1988 European Pat. Off. .
58-168040 10/1983 Japan .
WO90/04203 4/1990 WIPO .

OTHER PUBLICATIONS

Patent Abstract of Japan, vol. 8, No. 6 (P-247) (1443) Jan. 12, 1984. (Corresponding to 58-168040).

*Primary Examiner*—Howard B. Blankenship
*Attorney, Agent, or Firm*—Fitzpatrick, Cella, Harper & Scinto

[57] ABSTRACT

A camera using a film which has a magnetic storage part comprises a magnetic head which is arranged to read or write information out of or into the magnetic storage part of the film; and a release device for releasing a positional relation between the magnetic head and the film from an information reading or writing state in which the magnetic head reads or writes the information, until the film is wound around a spool or when the film is stopped.

64 Claims, 13 Drawing Sheets

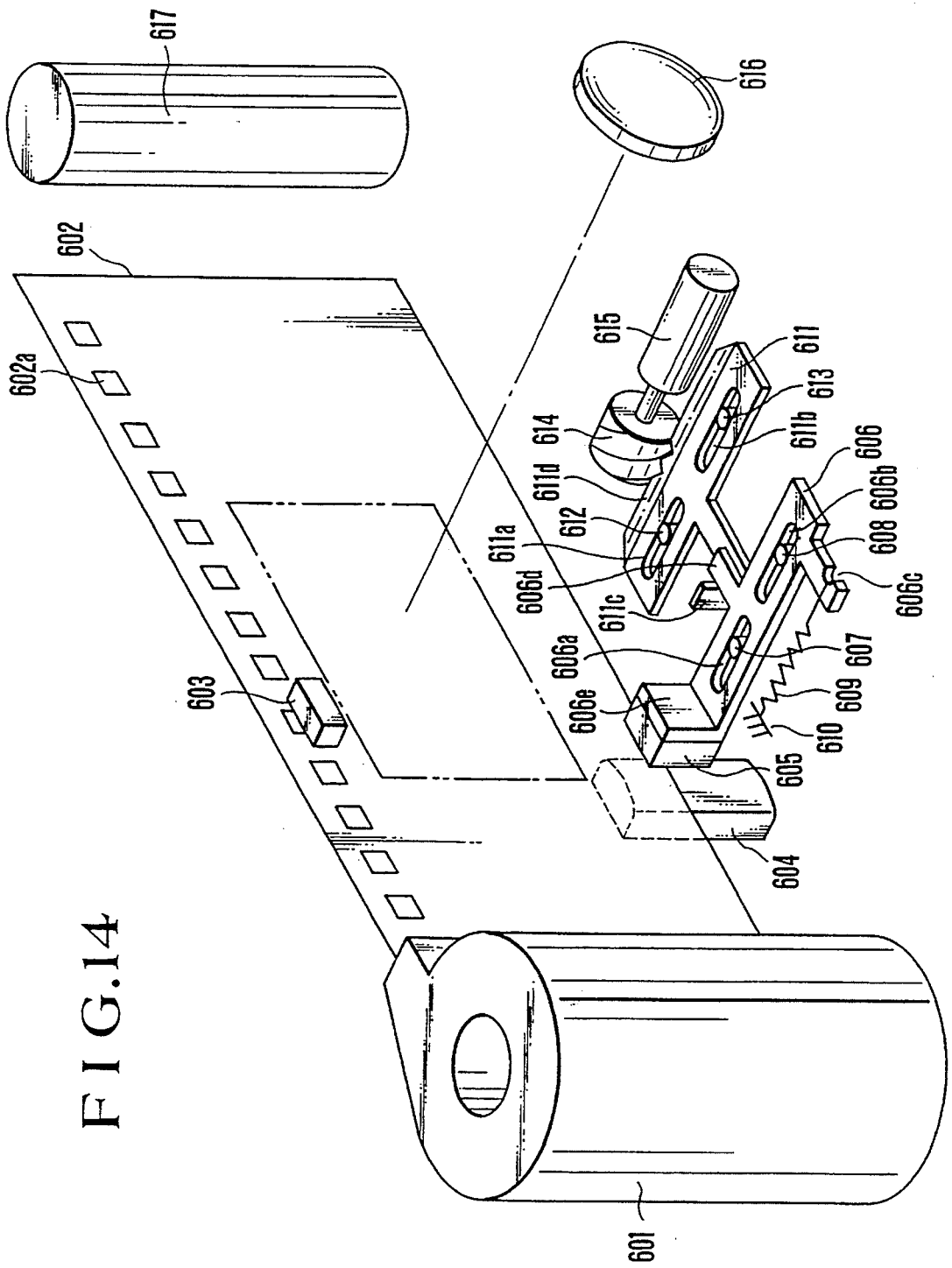
F I G. 14

CAMERA WITH RETRACTABLE MAGNETIC HEAD AND RETRACTABLE PAD

This application is a continuation of application Ser. No. 08/141,681, filed Oct. 26, 1993, which is a continuation of application Ser. No. 07/867,312, filed Apr. 10, 1992, which is a continuation of application Ser. No. 07/633,997, filed Dec. 26, 1990, all now abandoned.

BACKGROUND OF THE INVENTION

1. Field of the Invention

This invention relates to an improvement in a camera of the kind using a film provided with a magnetic storage part and having a magnetic head arranged in the camera to read information such as ISO data, etc. written in the magnetic storage part of the film and to write therein some information as necessary.

2. Description of the Related Art

Cameras of the kind using a kind of film that has a magnetic storage part have recently been proposed, for example, as disclosed in U.S. Pat. No. 4,864,332. This camera is arranged to record in the magnetic storage part some photographic information such as a shutter time value, an aperture value, a date, a title, etc. and to read the recorded information as necessary out of the magnetic storage part by means of a magnetic head. However, practical attempts for affecting cameras of the kind having this magnetic head have encountered the following problems:

1) Cameras of the kind disclosed in U.S. Pat. No. 4,841,319 etc. are arranged as follows: A film cartridge containing the whole roll of film completely therein including the leader part of the film is used. The film cartridge is inserted into a cartridge chamber, for example, from one side of the camera. The film is then pushed out of the cartridge by driving its shaft with a fork. With the cartridge of the kind used for a film having a magnetic storage part, an automatic film loading operation tends to become impossible, because the writing/reading magnetic head is merely arranged to come into contact with the film surface, the fore end part of the film tends to collide either with the magnetic head or with a film retaining pad and to be bent and warped when it is pushed out from the cartridge.

2) When the camera is carried by the photographer, for example, by hanging on the neck while walking, vibrations are transmitted to the camera. Under such a condition, various accidents tend to happen including that the magnetic storage part of the film might be damaged by the movement of the magnetic head.

SUMMARY OF THE INVENTION

This invention is directed to the solution of a above-stated problems. It is, therefore, an object of the invention to provide a camera which is of the kind using a film having a magnetic storage part and is capable of ensuring an adequate automatic film loading operation and preventing the magnetic head from being abraded and the film surface from being damaged by the head. To attain this object, a camera according to this invention comprises in combination a magnetic head which is arranged to read or write information out of or into the magnetic storage part of a film; and a release means for releasing a positional relation between the magnetic head and the film from a state for writing or reading the information until the film is wound around a spool or when the film is stopped.

The above and other objects and features of the invention will become apparent from the following detailed description of embodiments thereof taken in conjunction with the accompanying drawings.

BRIEF DESCRIPTION OF THE DRAWINGS

FIG. 14 is an oblique view showing the arrangement of the essential parts of a camera arranged as a further embodiment of the invention.

DETAILED DESCRIPTION OF THE PREFERRED EMBODIMENTS

Figure 2:
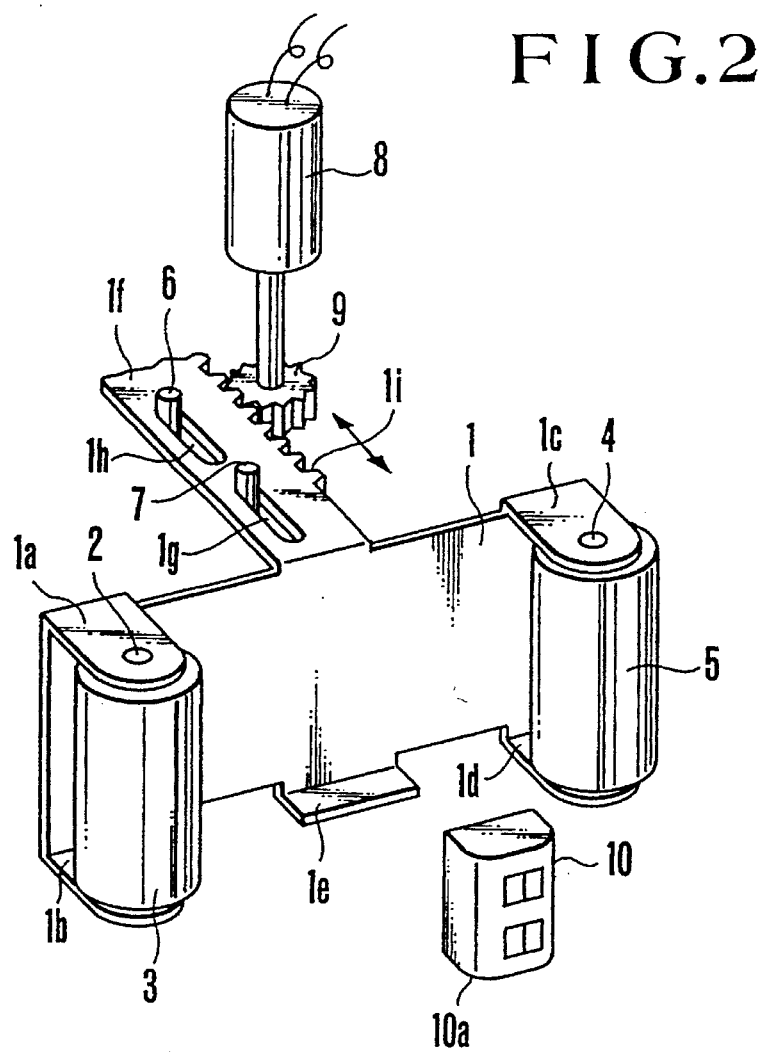
FIG. 2 is an oblique view showing the arrangement of the essential parts of the same camera.
Figure 2:
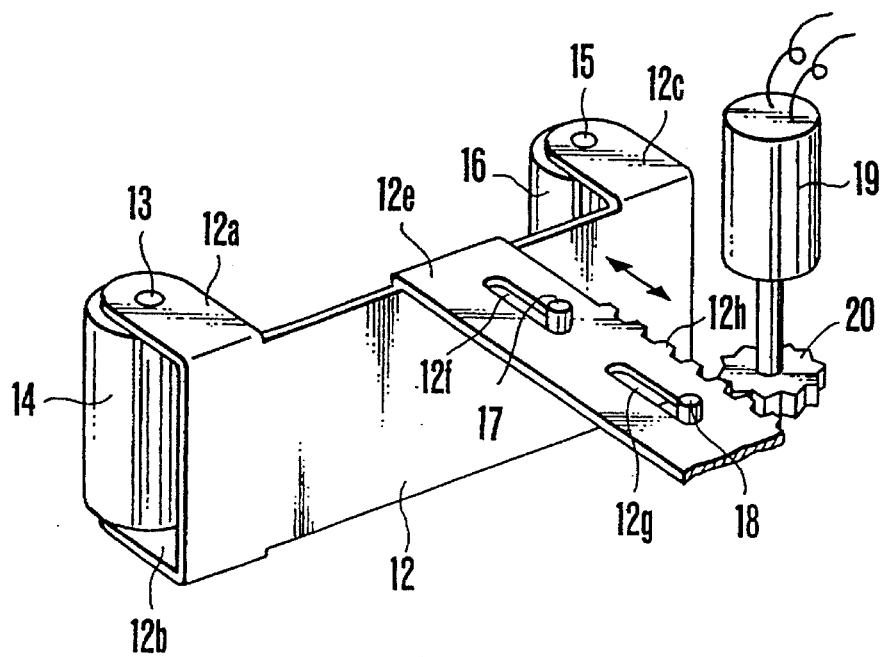

The following discussion describes the embodiments of this invention with reference to the accompanying drawings:

FIG. 2 shows the essential mechanism of a camera which is arranged according to this invention as an embodiment thereof. Referring to FIG. 2, a head base plate 1 has bent parts 1a, 1b, 1c, 1d, 1e and 1f. The bent part 1f is provided with slots 1g and 1h. Pins 6 and 7 which are provided on the camera body are slidably fitted in the slots 1g and 1h. A shaft 2 is arranged between the bent parts 1a and 1b. A roller 3 which is made of an elastic material is rotatably carried by the shaft 2. A shaft 4 is arranged between the bent parts 1c and 1d to rotatably carry another roller 5 which is also made of an elastic material. A pinion 9 is secured to the fore end of a motor 8. The pinion 9 is arranged to engage a rack 1i which is formed on the bent part 1f. When the motor 8 rotates, the head base plate 1 moves in the directions of the arrows with the guidance of the pins 6 and 7. A magnetic head 10 is arranged to write or read information into or out of a magnetic storage part provided on a film. The bottom part 10a of the magnetic head 10 is secured to the bent part 1e. The writing or reading face of the magnetic head 10 is arranged to be flush with the faces of the rollers 3 and 5. A retaining base plate 12 has bent parts 12a, 12b, 12c, 12d (not shown) and 12e. Slots 12f and 12g are formed in the bent part 12e. Pins 17 and 18 which are provided on the camera body are slidably fitted in the slots 12f and 12g. A shaft 13 is interposed between the bent parts 12a and 12b. A roller 14 which is made of an elastic material is rotatably carried by the shaft 13. A shaft 15 is arranged between the bent parts 12c and 12d to rotatably carry thereon a roller 16 which is also made of an elastic material. A motor 19 has a pinion 20 secured to its fore end. The pinion 20 is arranged to engage a rack 12h which is provided on the bent part 12e. When the motor 19 rotates, the retaining base plate 12 moves in the directions of the arrows, being guided by the pins 17 and 18.

Figure 3:
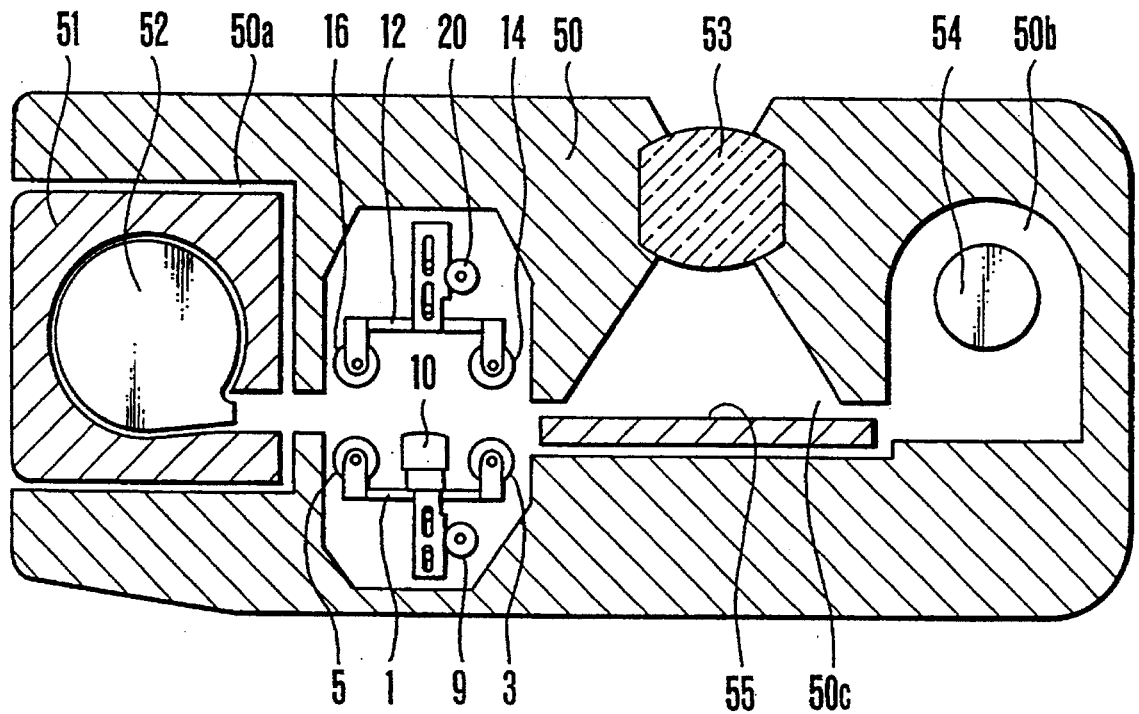
FIG. 3 is a sectional view showing the camera which is arranged according to this invention as an embodiment thereof.

FIG. 3 is a sectional view showing the camera which is arranged as the embodiment of the invention. The camera which has the above-stated mechanism therein uses a film cartridge box which is arranged to contain the whole film without leaving its leader part on the outside thereof. As disclosed, for example, in U.S. Pat. No. 4,834,306, the cartridge box of this kind is arranged to have the whole film placed within it including the leader part when the film is not in use. The cartridge box is placed inside the camera body. The back cover of the camera is then closed. After that, the film is allowed to be moved to the outside of the cartridge box by the rotation of the shaft of the cartridge box caused by the driving force of a film feeding fork.

Referring to FIG. 3, the camera body 50 has a cartridge chamber 50a, a spool chamber 50b and an aperture 50c. Reference numeral 52 denotes a cartridge which is disposed within the cartridge box 51. The illustration includes a photo-taking lens 53; a spool 54; a pressure plate 55; and a film 56 (see FIG. 5) which is provided with a magnetic storage part.

Figure 1:
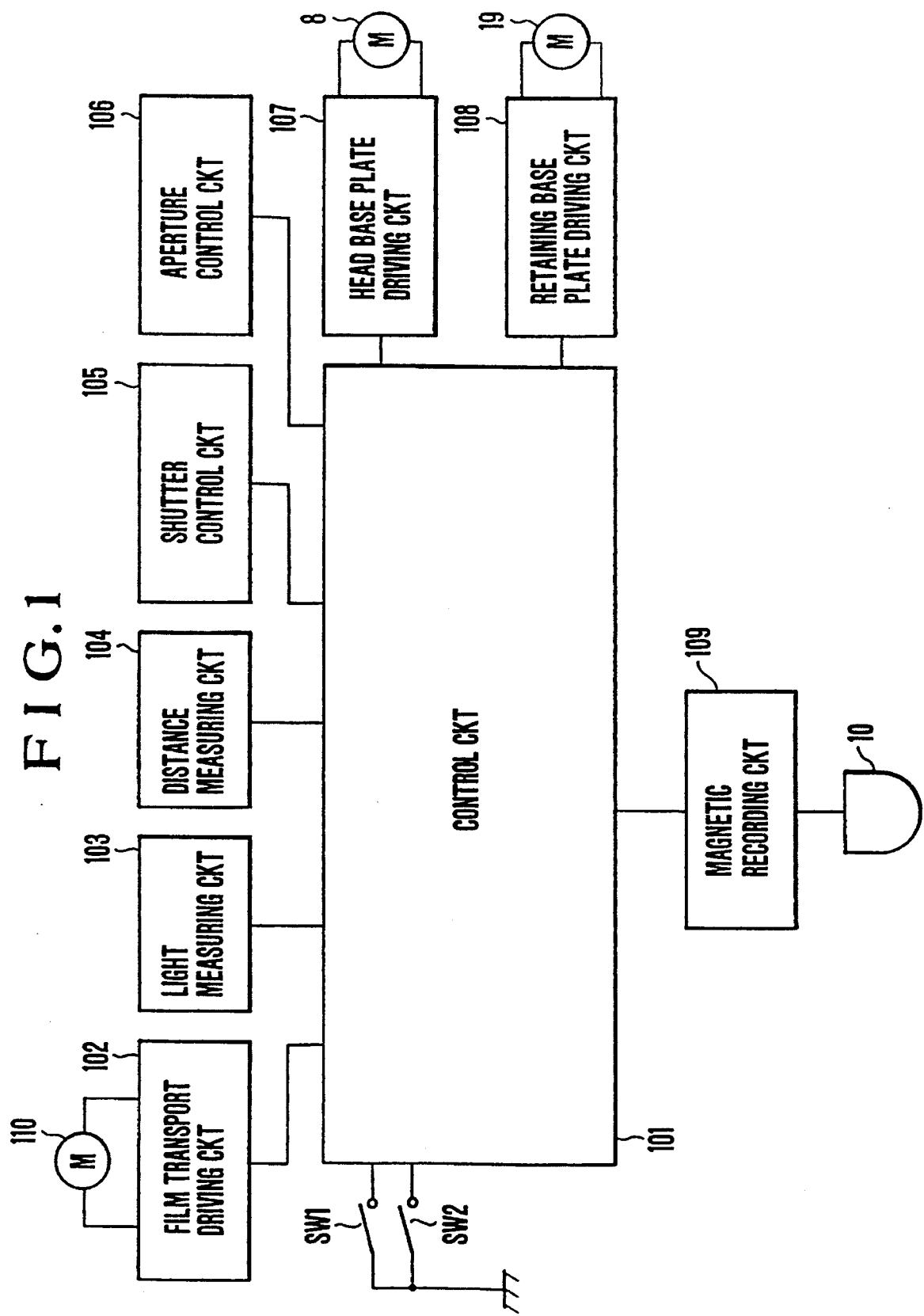
FIG. 1 is a block diagram showing the arrangement of a control circuit provided for a camera shown in FIG. 3.

FIG. 1 is a block diagram showing the electric circuits of the camera arranged as an embodiment of this invention. The illustration includes a control circuit 101 which is composed of a microcomputer, etc.; a film transport driving circuit 102 which is arranged to drive a film transport motor 110 for winding and rewinding the film; a light measuring circuit 103; a distance measuring circuit 104; a shutter control circuit 105; an aperture control circuit 106; a head base plate driving circuit 107 which is arranged to control the driving action of the motor 8 of FIG. 2 in setting the position of the above-stated head base plate 1; a retaining base plate driving circuit 108 which is arranged to set the position of the above-stated retaining base plate 12 by controlling the driving action of the motor 19 of FIG. 2; and a magnetic recording circuit 109 which is arranged to control the magnetic head 10 of FIG. 2. The camera is provided with a switch SW1 for commencement of light and distance measuring actions; and a release switch SW2.

Figure 4:
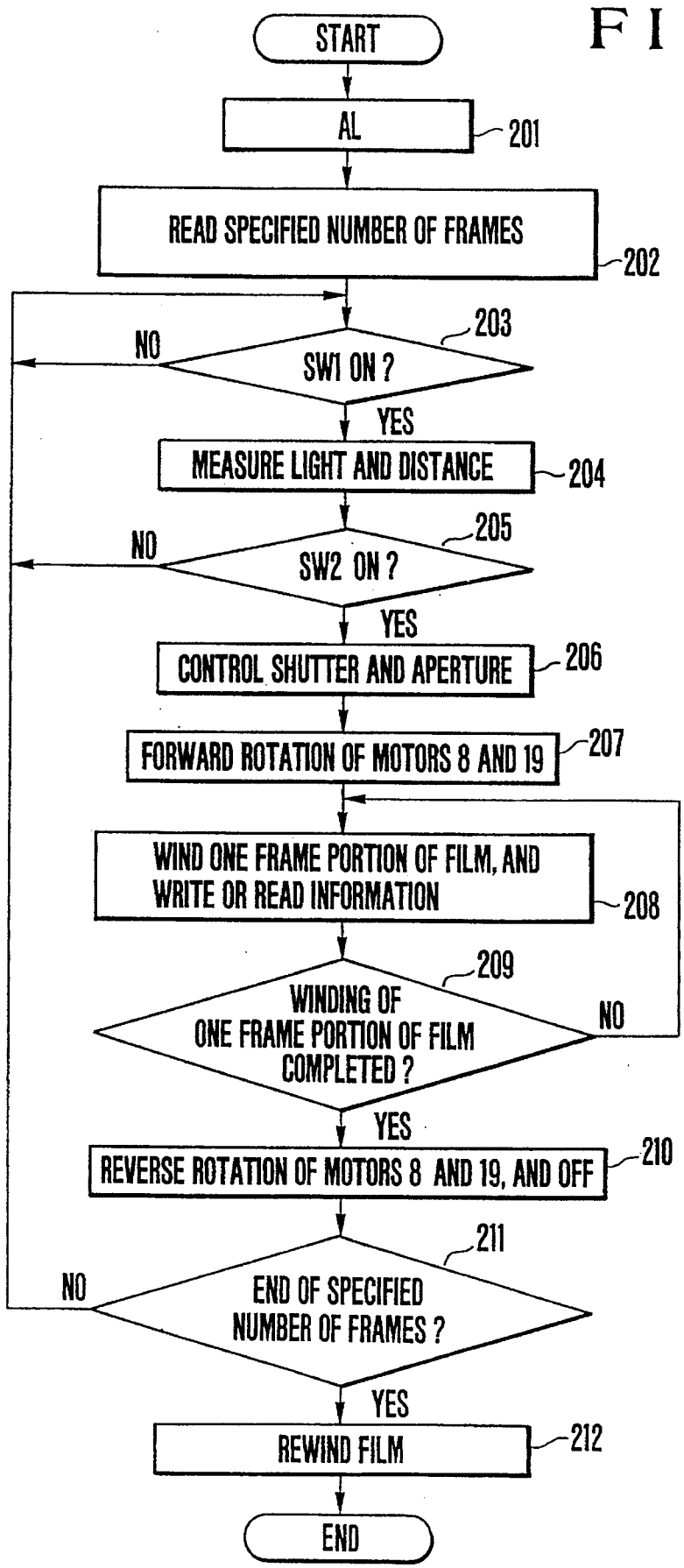
FIG. 4 is a flowchart showing the operation of the circuit of FIG. 1.

Referring to FIG. 4 which is a flowchart, the camera arranged as described above operates as follows:

At a step 201: With the cartridge box 51 inserted into the cartridge chamber 50a, a known automatic loading (AL) action is performed by pushing the film 56 out from the cartridge box 51 by causing the fork to be driven by the film transport driving circuit 102 through the motor 110. The film 56 is thus wound around the spool 54. At that time, as shown in FIG. 3, the head base plate 1 and the retaining base plate 12 are in their retracted positions away from the film 56. At a step 202: After that, data for the specified number of shootable frames of the film 56 is read through a DX code provided on the cartridge box. At a step 203: The state of switch SW1 is checked. If the switch SW1 is found to be in an on-state, the flow of operation proceeds to a step 204. At the step 204: The light measuring circuit 103 and the distance measuring circuit 104 are activated to obtain data for measured values of light and distance. At a step 205: The state of release switch SW2 is checked. If the switch SW2 is found to be in an on-state, the flow proceeds to a step 206. At the step 206: The shutter control circuit 105 and the aperture control circuit 106 are activated to perform a known exposure control action. Further, in either case where the switch SW1 or the switch SW2 is found to be not in the on-state, the flow comes back to the step 203.

Figure 5:
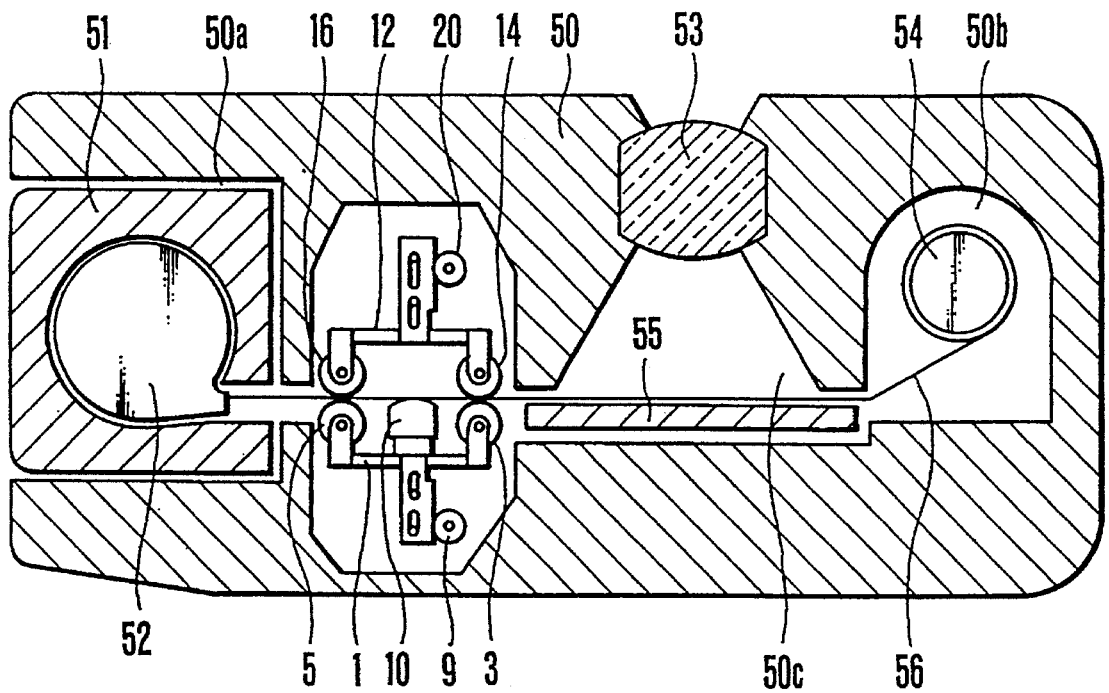
FIGS. 5 and 6 are sectional views showing the positions of various members obtained within the same camera in winding and rewinding the film respectively.
Figure 6:
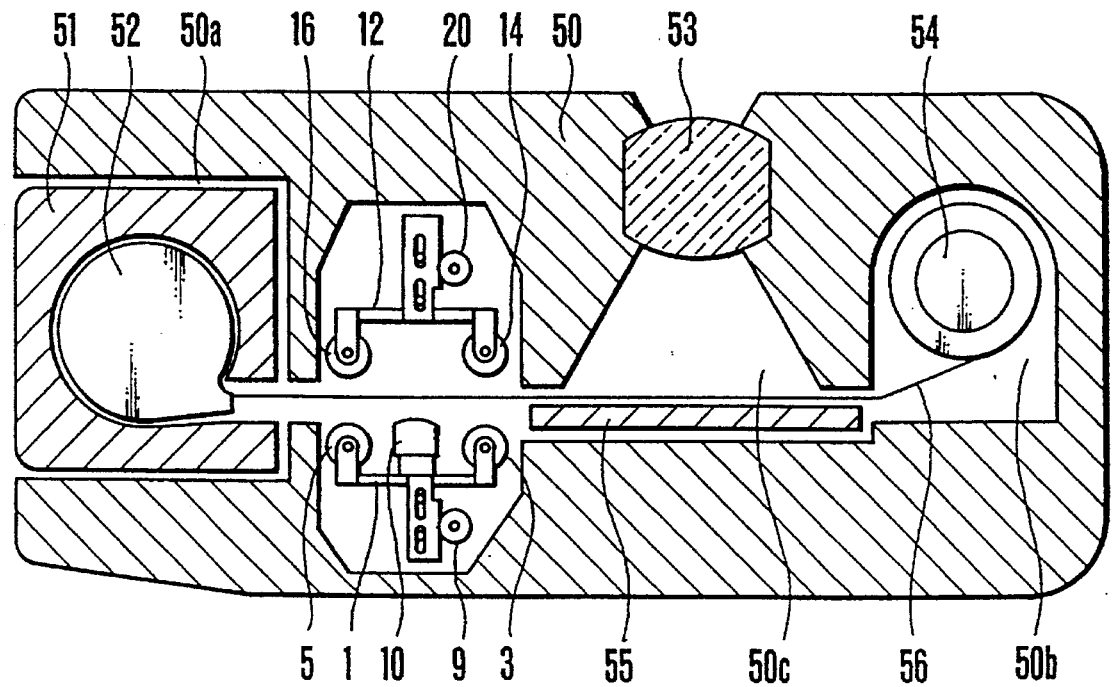

Upon detection of completion of the exposure control action mentioned above, the flow proceeds to a step 207. At the step 207: The motors 8 and 19 are respectively caused to rotate forward through the head base plate driving circuit 107 and the retaining base plate driving circuit 108. This brings the head base plate 1 and the retaining base plate 12 into their positions as shown in FIG. 5. In other words, the magnetic head 10 is brought into contact with the magnetic storage part (not shown) of the film 56. Meanwhile, the rollers 3 and 5 and the rollers 14 and 16 are pushed against the film surfaces to prevent, with a given force, the film 56 from slackening. The flow then comes to a step 208. At the step 208: The film transport motor 110 is driven by the film transport driving circuit 102 to wind up one frame portion of the film. At this moment, the magnetic head 10 is driven by the magnetic recording circuit 109 to magnetically write or read desired data into or out of the magnetic storage part which is moving. At a next step 209: A check is made for completion of the winding one frame portion of the film. If it is found to be not completed as yet, the preceding step 208 is repeated. Upon detection of completion of one frame winding, the flow comes to a step 210. At the step 210: Currents applied to the motors 8 and 19 are reversed by the head base plate driving circuit 107 and the retaining base plate driving circuit 108 to bring the head base plate 1 and the retaining base plate 12 back to their positions shown in FIG. 3. After this, the current supply to these motors is cut off. At a step 211: A check is made for the end of the specified number of frames. If the number of frames is found to have not come to an end as yet, the flow comes back to the step 203. If the end of the number of frames is detected at the step 211, the flow proceeds to a step 212. At the step 212: The film transport motor 110 is driven by the film transport driving circuit 102 to begin a film rewinding action. FIG. 6 shows the positions of members including the head base plate 1 and the retaining base plate 12 obtained during the process of film rewinding.

Figure 7:
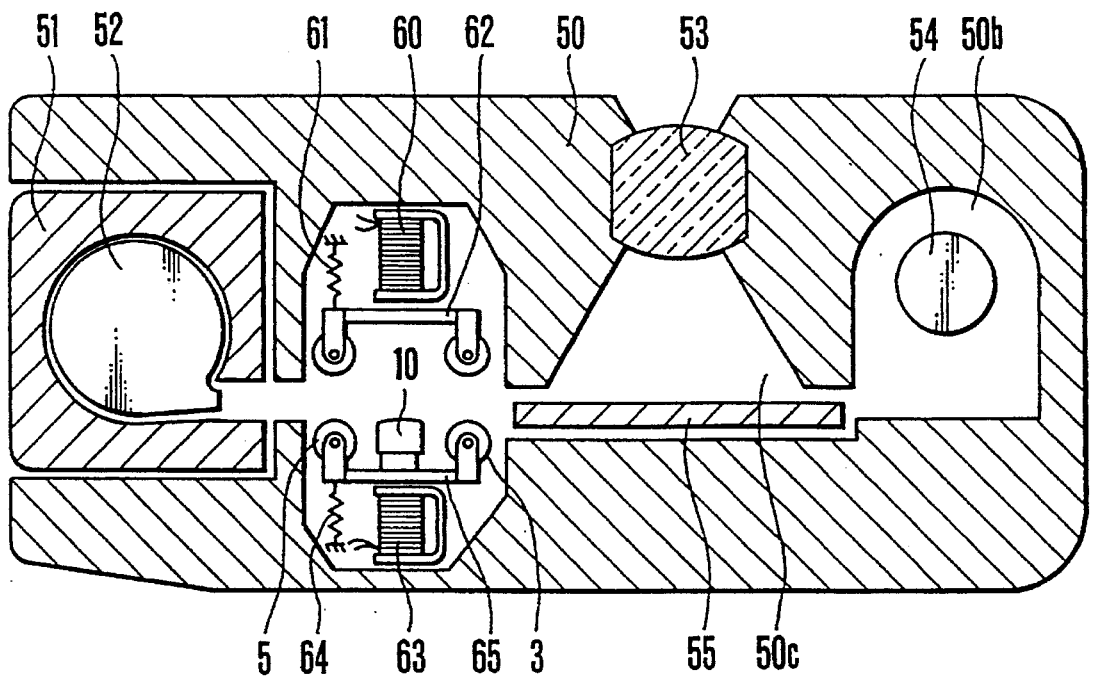
FIGS. 7 and 8 are sectional views showing the positions of various members obtained within another embodiment of the invention.

FIG. 7 shows in a sectional view a camera arranged as another embodiment of the invention. In FIG. 7, the same parts as those of the embodiment described in the foregoing are indicated by the same reference numerals.

Figure 8:
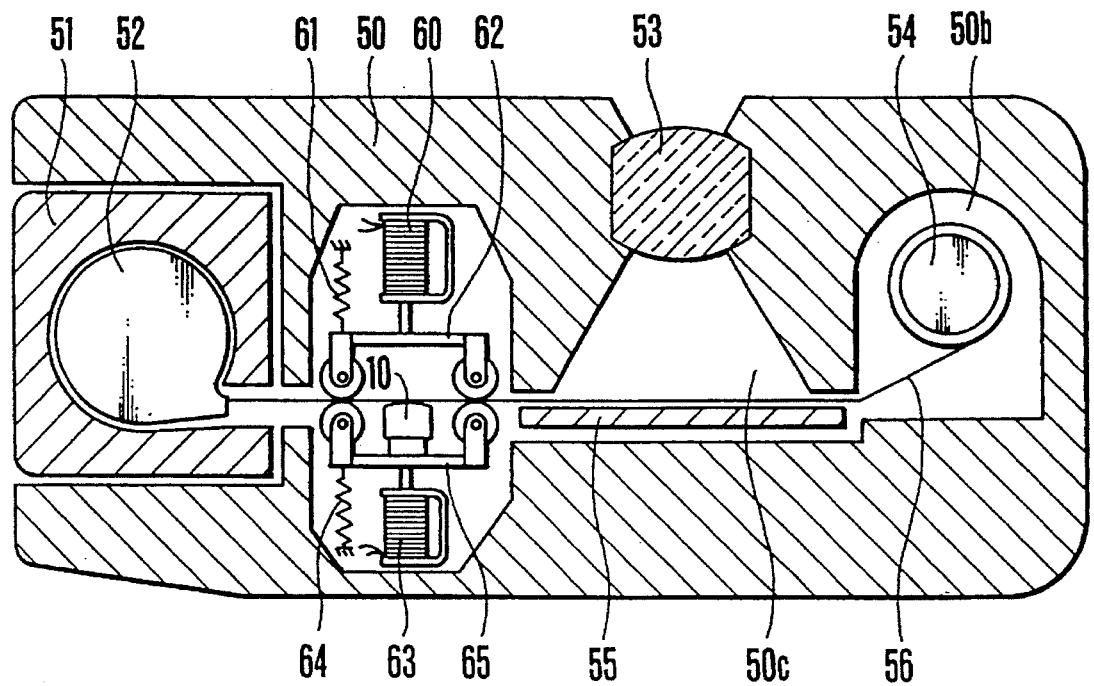

The embodiment shown in FIG. 7 differs from the embodiment described in the foregoing in the following point: The position of the head base plate 65 and that of the retaining base plate 62 are arranged to be controlled by means of a plunger 63, a spring 64, a plunger 60 and a spring 61. FIG. 8 shows how information (or data) is written or read into or out of the magnetic storage part (not shown) of the film 56 by the magnetic head 10. Except when the writing or reading action is to be performed, the head base plate 65 and the retaining base plate 62 are normally kept in the positions shown in FIG. 7. The control circuit arrangement of this embodiment is identical with that of the embodiment described in the foregoing. Therefore, the description of it is omitted.

In each of the embodiments shown in FIGS. 1 to 8, the magnetic head 10 is arranged to be kept in a state of being retracted away from the surface of the film 56 except when information is to be written in or read out during the process of film winding. This arrangement, therefore, effectively solves the problems including the hindrance of automatic loading by collision of the tip of the film; the abrasion or wear of the magnetic head 10 during the process of film rewinding; and the possibility of damaging the film surface by the magnetic head 10 while the camera is carried around by the photographer.

Figure 11:
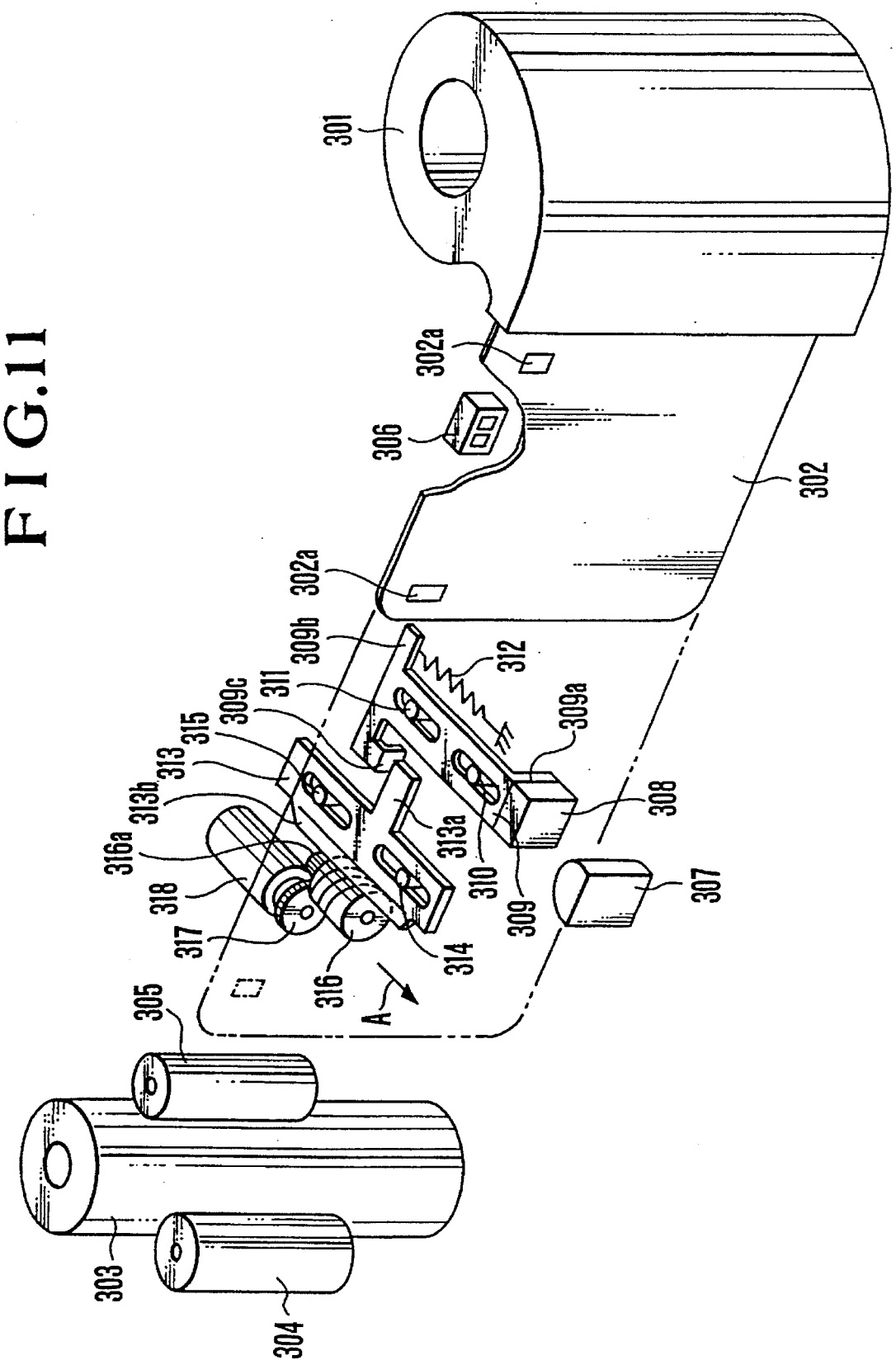
FIG. 11 is an oblique view showing the mechanical arrangement of the essential parts of the camera of FIG. 9.

FIG. 11 shows in an oblique view of the mechanical parts of a camera arranged as a further embodiment of this invention. Referring to FIG. 11, a film cartridge 301 is arranged to contain the whole film completely within it in the case of the embodiment described in the foregoing. A film 302 has a magnetic storage part (not shown) in which information such as ISO data, etc. is stored and also has one perforation (hole) 302a for each picture frame. The illustration includes a film take-up spool 303; film retaining rollers 304 and 305 which are provided for blank advancing of the film; a photo-reflector 306 which is provided for detecting the perforation 302a; a magnetic head 307 which is arranged to read out information on the ISO data, etc. from the magnetic storage part or to write some information or data into the storage part; and a pad 308 which is arranged to ensure adequate information reading or writing by pushing the surface of the film 302 against the magnetic head 307. A lever 309 has a bent-down part 309a to which the above-stated pad 308 is secured, a spring-hooking part 309b, and a protrusive part 309c which is arranged to abut on another lever 313. Shafts 310 and 311 are arranged to slidably carry the lever 309. A spring 312 is arranged to urge the lever 309 (together with the pad 308) to move toward the film 302. The above-stated lever 313 has a protrusive part 313a which is arranged to abut on the above-stated protrusive part 309c; and a rack part 313b which is arranged to engage a worm gear 316. Shafts 314 and 315 are arranged to slidably carry the lever 313. The above-stated worm gear 316 has an output gear 316a. A gear 317 engages the output gear 316a. A pad motor 318 has the gear 317 secured to the fore end thereof and is arranged as follows: When a forward current is applied to the pad motor 318 by a control circuit which will be described later, the pad 308 is moved to a position where the film is traveling in such a way as to push the film 302 against the magnetic head 307. When a reverse current is applied, the pad motor 318 retracts the pad 308 from the film travel position.

Figure 9:
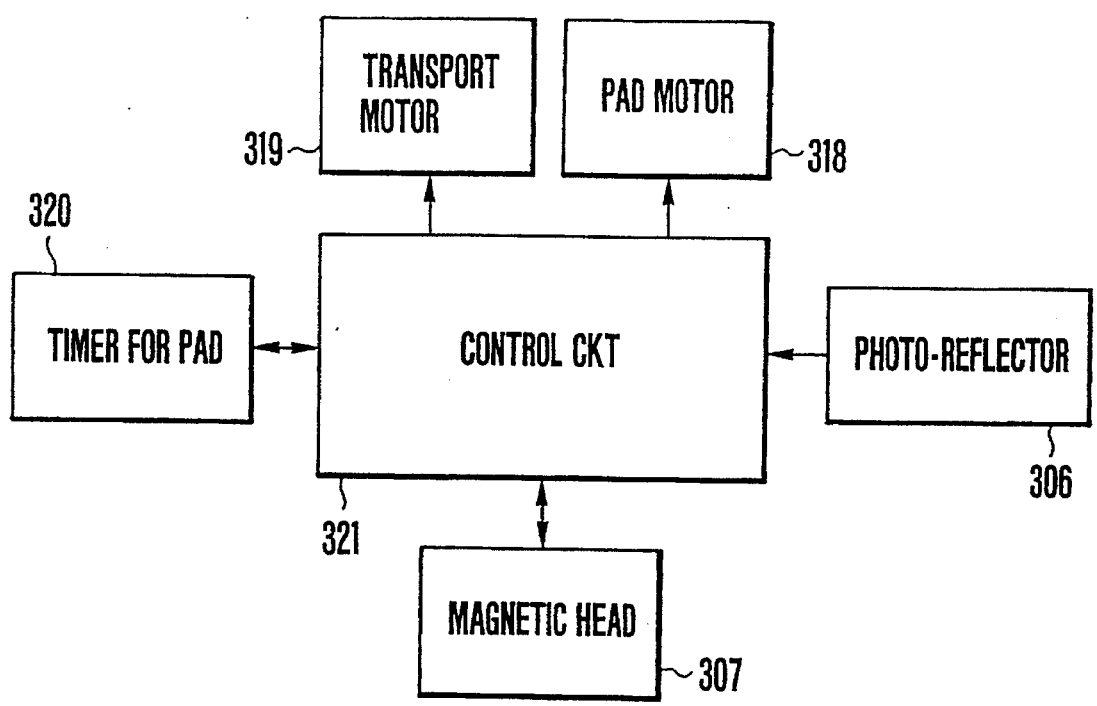
FIG. 9 is a block diagram showing the arrangement of a camera as another embodiment of the invention.

FIG. 9 is a block diagram showing the essential parts of the camera which has the above-stated mechanism. Referring to FIG. 9, a transport motor 319 is provided for feeding the film 302. When a forward current is applied to the motor 319, the film 302 is pushed out of the film cartridge 301 through a gear train which is not shown. A timer 320 for the pad is provided for determining a period of time for which the current is applied to the above-stated pad motor 318. A control circuit 321 is composed of a microcomputer, etc. and is arranged to control the above-stated photo-reflector 306, the magnetic head 307, the pad motor 318, the transport motor 319, the timer 320 for the pad, etc. The embodiment which is arranged as described above operates as described below with reference to FIG. 10 which is a flowchart:

A step 401: A check is made to find if the camera is loaded with the film cartridge 301, If so, the flow of operation proceeds to a step 402. At the step 402: The photo-reflector 306 is rendered operative. At a step 403: A forward current is applied to the transport motor 319 to start a blank advancing action on the film. As a result, the film 302 is pushed out from the film cartridge 301. The perforation 302a is detected by the photo-reflector 306. The control circuit 321 then counts the number of perforations detected by the photo-reflector 306. At a step 404: A check is made to find if the number of perforations detected has reached a number m. If so, the flow proceeds to a step 405 on the assumption that the fore end part of the film 302 has been wound around the film take-up spool 303. At the step 405: A forward current begins to be applied to the pad motor 318 to bring the pad 308 to the film travel position. At a next step 406: The timer 320 which is provided for the pad is started.

When the forward current is applied to the pad motor 318 as mentioned above, the members of the embodiment operate as follows: The output of the pad motor 318 is transmitted to the lever 313 via the gear 317 and the worm gear 316. This causes the lever 313 to begin to slide in the direction of arrow A. As a result, the lever 309 is released from its position restricted by the lever 313 and is thus allowed to slide in the same direction by the urging force of the spring 312. The pad 308 which is secured to the bent-down part 309a of the lever 309 is also moved in the direction of arrow A, i.e., toward the magnetic head 307. After that, the pad 308 reaches the surface of film 302 to push the magnetic storage part of the film 302 against the magnetic head 307. The moving degree of the lever 313 is set at a value larger than the moving degree of the lever 309 to ensure that the film 302 is pushed against the magnetic head 307 without fail.

At a step 407: The timer 320 for the pad is checked to see if a given count value has been counted by the timer 320. If so, it indicates that a period of time required by the pad 308 for pushing the film 302 against the magnetic head 307 has elapsed. In that case, therefore, the flow comes to a step 408. At the step 408: The current applied to the pad motor 318 is cut off. At a step 409: The magnetic head 307 is driven to read ISO information, etc. out from the magnetic storage part of the film 302. At a step 410: A check is made to see if an input indicative of the n-th perforation hole has been detected by the photo-reflector 306. If so, it means that a first frame has reached a shooting position (aperture position). The flow then proceeds to a step 411. At the step 411: The current applied to the transport motor 319 is cut off and the flow comes to a step 412. At the step 412: The driving action on the magnetic head 307 is brought to a stop. At a step 413: A reverse current begins to be applied to the pad motor 318 to retract the pad 308 from the film travel position. At a step 414: The timer 320 for the pad is started. At a step 415: A check is made to see if a period of time required for retracting the pad 308 back to its initial position has elapsed. If so, the flow comes to a step 416. At the step 416: The current applied to the pad motor 318 is cut off.

Figure 12:
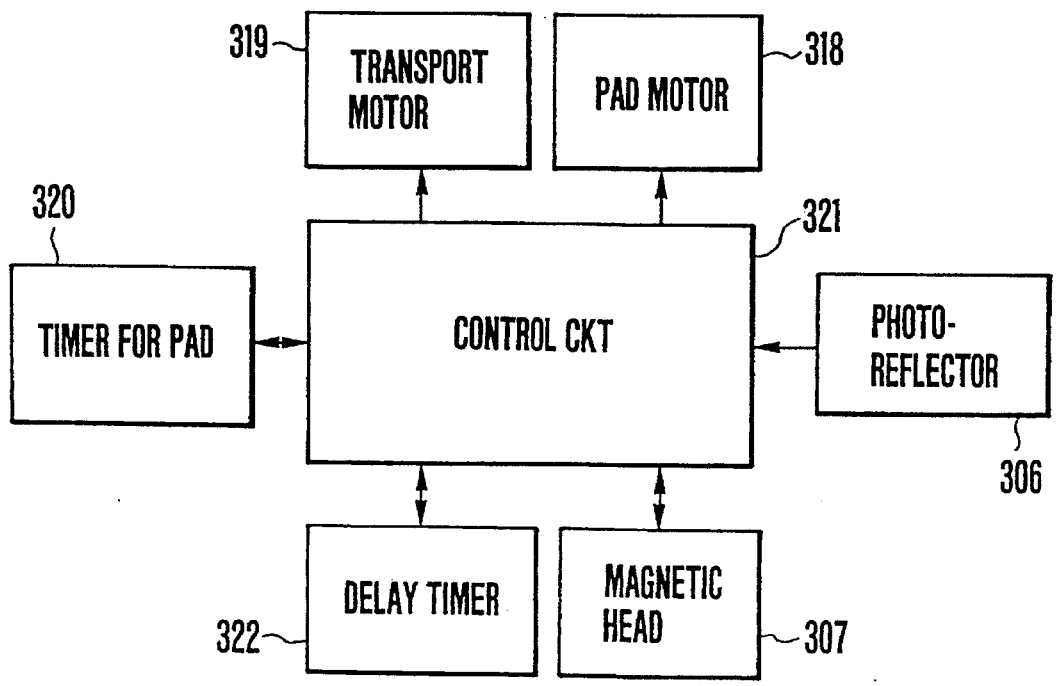
FIG. 12 is a block diagram showing a camera arranged as a further embodiment of the invention.

FIG. 12 shows in a block diagram a camera arranged as a further embodiment of the invention. In FIG. 12, the same parts as those of FIG. 9 are indicated by the same reference numerals, This embodiment differs from the embodiment shown in FIG. 9 in the following point: The forward current is applied to the pad motor 318 only when a given period of time has elapsed after the m-th hole of perforations 302a is detected by the photo-reflector 306. A delay timer 322 is provided for this purpose.

Figure 10:
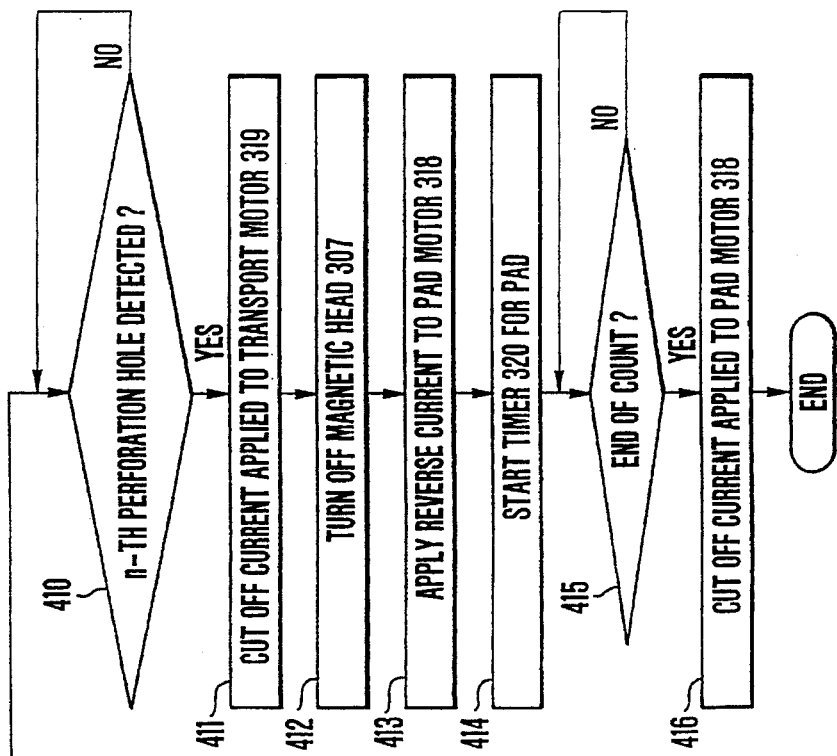
FIG. 10 is a flowchart showing the operation of the camera of FIG. 9.
Figure 10:
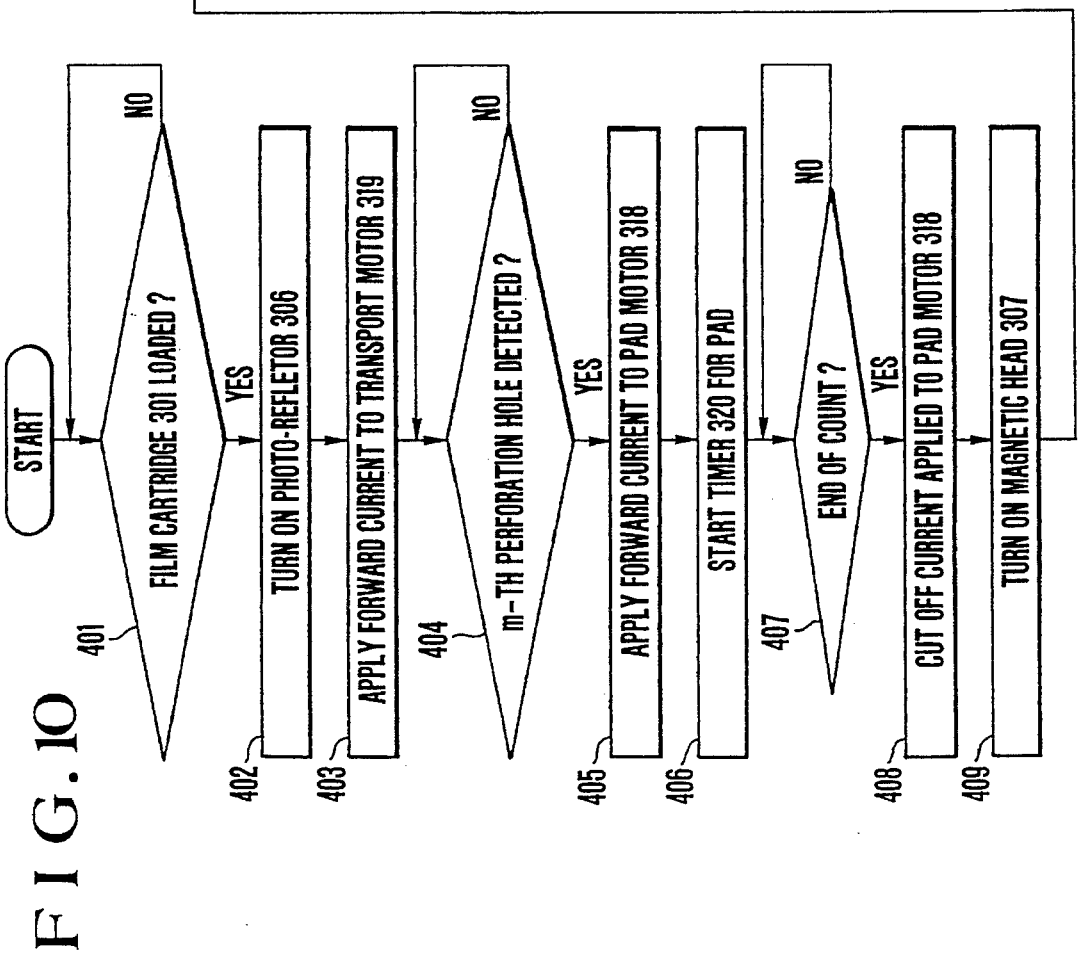

The operation of the embodiment arranged as shown in FIG. 12 is described below with reference to FIG. 13 which is a flowchart. In the flowchart, the same parts as those of FIG. 10 are indicated by the same step numbers and the details of them are omitted from the following description:

At the step 404: A check is made to find if the m-th hole of perforations 302a is detected by the photo-reflector 306.

If so, the flow comes to a step 501. At the step 501: The delay timer 322 is started. At a next step 502: The flow of operation awaits the end of the count by the delay timer 322. Upon detection of the end of the count, the flow comes to the step 405 to begin to apply the forward current to the pad motor 318 to cause the pad 308 to be moved to the film travel position.

The reason for the arrangement of starting the power supply to the pad motor 318 after the lapse of a given delaying period of time as mentioned above is as follows: In a case where the film 302 is provided with only one perforation 302a for each of frames as in the case of this embodiment, an excessively large portion of the film might be wound around the film take-up spool 303 by the time when the third hole of perforation of the film is detected, although the fore end part of the film 302 has not been wound around the take-up spool 303 when the second perforation hole is detected. In view of this, the embodiment is arranged to begin information reading at an intermediate point between the second and third perforations. This effectively prevents blank advancing of too many frames.

Unlike in the case of the embodiment shown in FIG. 9, as apparent from the above, the m-th perforation mentioned at the step 404 is a hole immediately preceding a hole at which too much film would be taken up on the film take-up spool 303 before detection of it.

In each of the embodiments shown in FIGS. 9 to 13, the power is arranged to begin to be applied to the pad motor 318 to move the pad 308 to the film travel position either after a given number of perforations are detected or when a given period of time has elapsed after detection of a given number of perforations, that is, after the film is completely wound around the film take-up spool 303. The magnetic head 307 is arranged to be allowed to read information recorded on the film 302 after the pad 308 has been thus set in the film travel position. Therefore, information on the ISO data, etc. can be completely read out during the process of blank advancing of film after the film 302 is normally pushed out from the film cartridge 301 and before the first frame portion of the film comes to the aperture position. Therefore, the camera can be readied for an accurate operation before photographing.

Further, each of the embodiments shown in FIGS. 9 to 13 is arranged to detect that the fore end of the film 302 has been wound around the film take-up spool 303 by counting the number of the perforations 302a of the film 302 by means of the photo-reflector 306. However, the invention is not limited to this arrangement. This method may be replaced with some different methods including, for example, a method wherein: Light projecting and receiving elements are arranged near to the film take-up spool 303 to detect arrival of the fore end of the film 302 at the spool; and the fore end portion of the film 302 is considered to have been completely wound around the spool 303 after the lapse of a given period of time.

FIG. 14 is an oblique view showing the arrangement of the essential parts of a camera which is arranged as a further embodiment of the invention. Referring to FIG. 14, a cartridge box 601 is arranged, like the embodiment described in the foregoing, to have a whole roll of film 602 which has a magnetic storage part (not shown) and perforations 602a completely contained therein until immediately before automatic loading. The cartridge box 601 is inserted into a cartridge chamber which is not shown. A photo-reflector 603 is arranged in the path of the perforations 602a of the film 602 to detect the state of the film feeding process.

A magnetic head 604 is secured to a pressure plate or the like (not shown) and is arranged to read information (relating to ISO data, specified available number of frames, etc.) recorded in the magnetic storage part and to write information therein. A film retaining pad 605 is made of an elastic material such as rubber and has a film contacting surface arranged to be as smooth as possible. A lever 606 has a bent-up part 606e which is arranged to carry the film retaining pad 605; slot parts 606a and 606b which are slidably fitted on pins 607 and 608 provided on the camera body; and protrusive parts 606c and 606d. One end of a spring 609 is hooked on the protrusive part 606c while the other end of the spring 609 is attached to a structural member 610 of the camera body. The spring 609 is thus arranged to constantly urge the lever 606 to move toward the surface of the film 602.

A lever 611 has slot parts 611a and 611b which are slidably fitted on pins 612 and 613 provided on the camera body; a protrusive part 611c which is arranged to have the protrusive part 606d of the above-stated lever 606 abut thereon; and a rack part 611d which engages a worm gear 614. The worm gear 614 is secured to the output shaft of a motor 615 and is arranged to transmit the output of the motor 615. When the motor 615 rotates forward, the film retaining pad 605 is moved toward the surface of the film 602 via the levers 611 and 606. A reference numeral 616 denotes a photo-taking lens. A numeral 617 denotes a film take-up spool.

Figure 15:
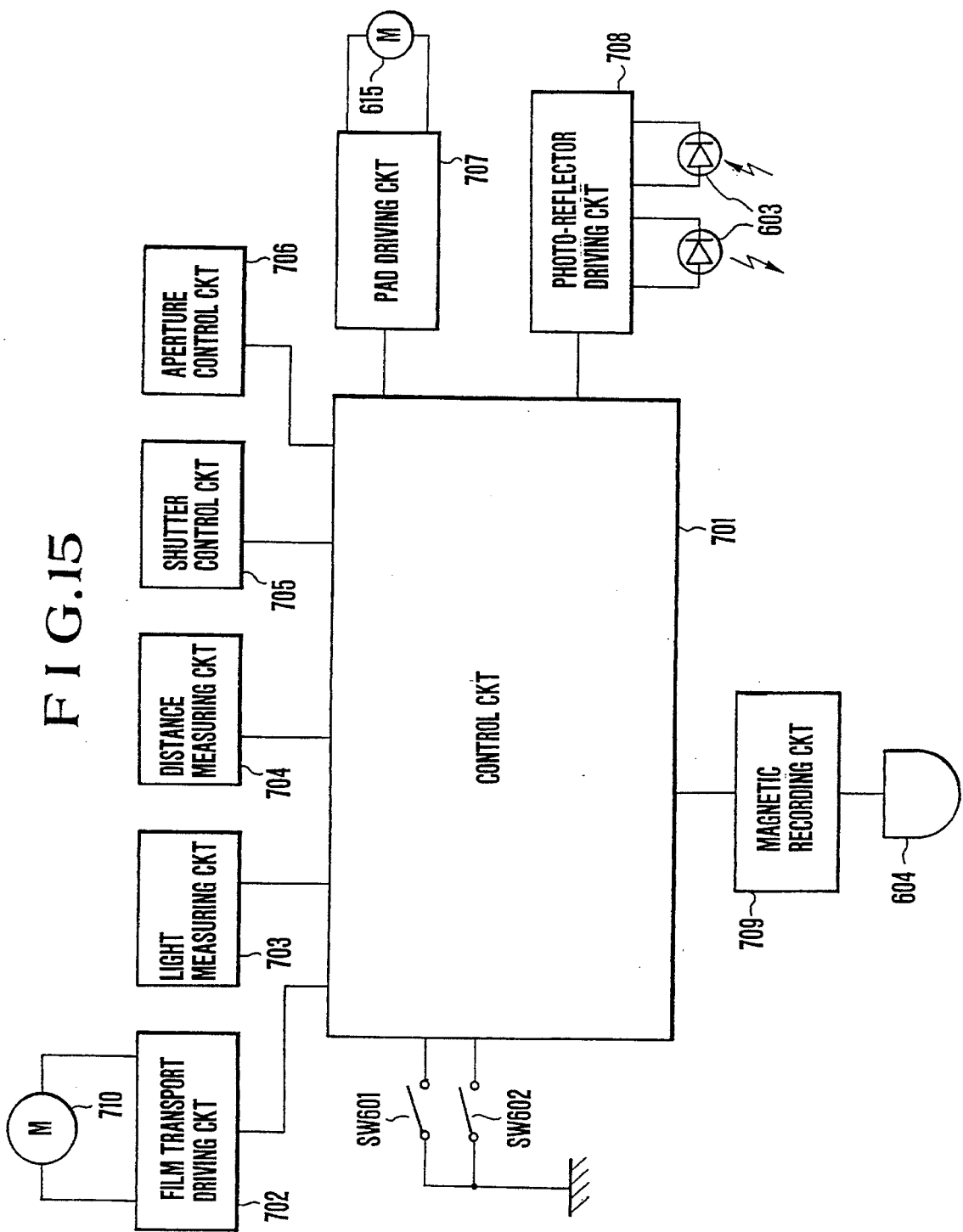
FIG. 15 is a circuit diagram showing the camera of FIG. 14.

FIG. 15 shows in a block diagram the circuit arrangement of the camera shown in FIG. 14. Referring to FIG. 15, a control circuit 701 is arranged to control the whole camera. A film transport driving circuit 702 is arranged to drive a transport motor 710 which performs film winding and rewinding actions. The illustration includes a light measuring circuit 703; a distance measuring circuit 704; a shutter control circuit 705; and an aperture control circuit 706. A pad driving circuit 707 is arranged to control the motor 615 of FIG. 14 to have the film retaining pad 605 moved through the levers 611 and 606 in such a way as to either come to push the surface of the film 602 or to be retracted away from the film 602. A photo-reflector driving circuit 708 is arranged not only to drive the photo-reflector 603 of FIG. 14 but also to count the number of perforations 602a detected by the photo-reflector 603. A magnetic recording circuit 709 is arranged to control the magnetic head 604 of FIG. 14.

FIG. 15 further includes a switch SW601 which is provided for starting a light measuring action; and a switch SW602 which is a release switch.

Figure 16:
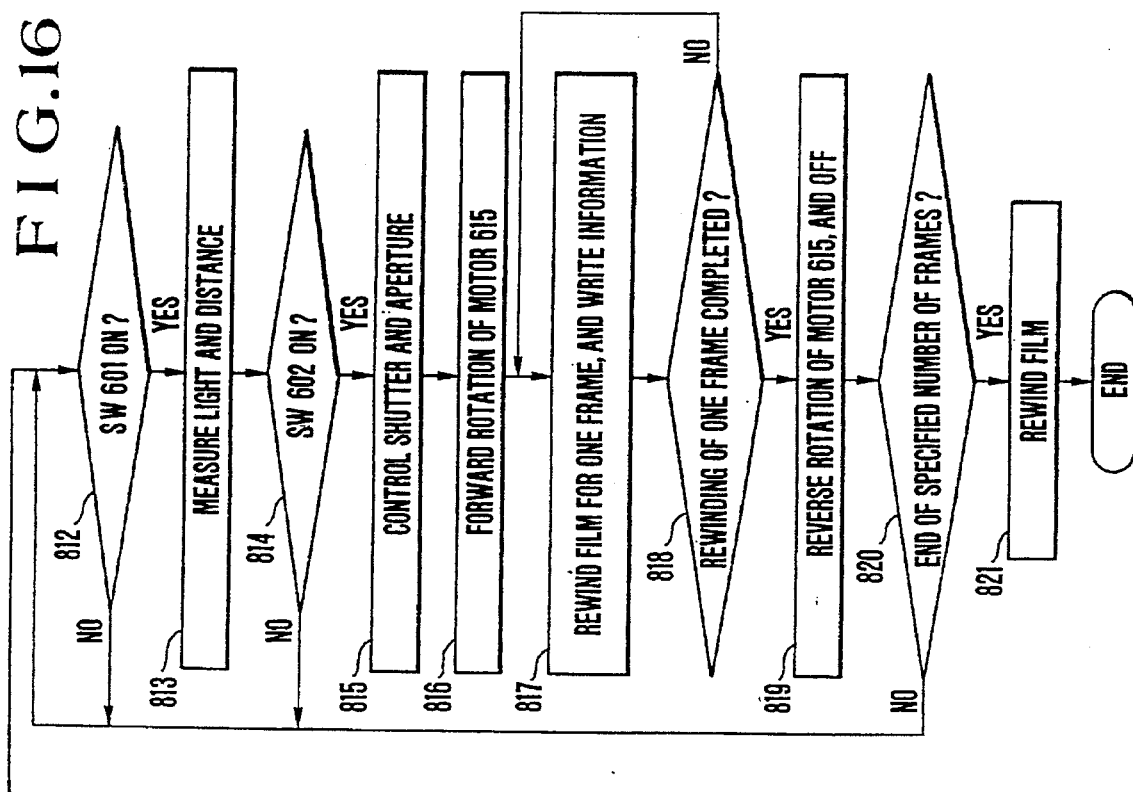
FIG. 16 is a flowchart showing the operation of the camera of FIG. 14.
Figure 16:
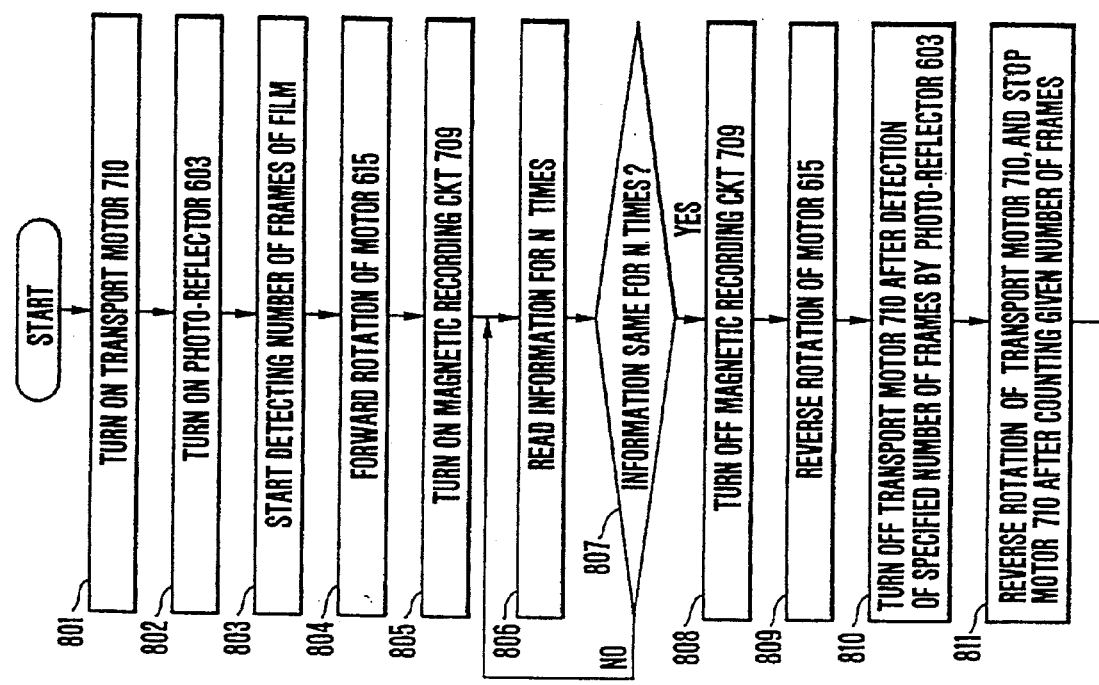

The embodiment which is arranged as described above operates as described below with reference to FIG. 16 which is a flowchart:

Step 801: When the back cover of the camera is closed with the cartridge box 601 placed within the cartridge chamber which is not shown, the film transport driving circuit 702 is caused to drive the transport motor 710. The film 602 is then pushed out from the cartridge box 601 and begins to be wound around the spool 617. In other words, a known automatic loading (AL) action begins. At this moment, the film retaining pad 605 remains in its retracted position to prevent the surface of the film 602 from coming into contact with the magnetic head 604.

Step 802: The photo-reflector driving circuit 708 is caused to drive the photo-reflector 603. Step 803: The photo-reflector driving circuit 708 counts the number of ON and OFF signals coming from the photo-reflector 603. In other words, the detection of the number of frames of the film 602 begins. Step 804: The pad driving circuit 707 is caused to drive the motor 615 to rotate forward for a given period of time when a given number of frames is counted by the photo-reflector driving circuit 708, i.e., when the film 602 is wound around the spool 617.

The forward rotation of the motor 615 causes, via the worm gear 614, the lever 611 of FIG. 15 to move toward the surface of the film 602. This releases the lever 606 from its position restricted by the protrusive part 611c of the lever 611 to allow it to be moved also toward the surface of the film 602 by the urging force of the spring 609. As a result, the film retaining pad 605 which is secured to the bent-up part 606e comes to push the surface of the film 602 against the magnetic head 604. In this instance, the movement stroke of the lever 611 is arranged to be larger than that of the lever 606 for the purpose of ensuring that the film retaining pad 605 comes to push the surface of the film 602 against the magnetic head 604 without fail.

Step 805: The magnetic recording circuit 709 is caused to drive the magnetic head 604. Step 806: The information written in the magnetic storage part of the film 602 is read out for an N number of times. Step 807: A check is made to find if the information read out remains unchanged through the reading action repeated N number of times. If so, the flow proceeds to a step 808. At the step 808: The information reading action of the magnetic head is brought to a stop by causing the magnetic recording circuit 709 to stop driving the magnetic head.

Step 809: The pad driving circuit 707 is caused to drive the motor 615 by applying a reverse current to the motor 615. The motor 615 is thus rotated in the direction reverse to the direction in which it is rotated at the step 804. The reverse rotation of the motor 615 causes, via the worm gear 614, the lever 611 to move in the direction of moving away from the surface of the film 602. The lever 606 then has its protrusive part 606d pushed by the protrusive part 611c of the lever 611. This causes the lever 606 to begin to move in the same direction against the urging force of the spring 609. As a result, the film retaining pad 605 is retracted away from the surface of the film 602.

Step 810: When the photo-reflector driving circuit 708 which constantly monitors the film feeding state comes to detect a specified number of frames, that is, when the circuit 708 counts "a number of perforations for 36 frames+a number of perforations for a given number of frames", with the specified number of frames detected assumed to be 36, the film transport driving circuit 702 is caused to stop driving the transport motor 710.

Step 811: The film transport driving circuit 702 is caused to drive the transport motor 710 to rotate it in the reverse direction to a degree corresponding to the number of perforations for the above-stated given number of frames for which the film is excessively wound up. Upon completion of this action, the transport motor 710 is brought to a stop. Under a condition which is thus obtained, the 36th frame portion of the film 602 is exactly and accurately located in the aperture position.

Step 812: The switch SW601 is checked for its state, If the switch SW601 is found in an on-state, the flow proceeds to a step 813. At the step 813: Since the switch SW601 is in its on-state, the light measuring circuit 703 and the distance measuring circuit 704 are driven to give information on measured values of light and distance. At a step 814: The release switch SW602 is checked for its state. If the switch SW602 is found in an on-state, the flow comes to a step 815, At the step 815: Since the release switch SW602 is in the on-state, the shutter control circuit 705 and the aperture control circuit 706 are driven to perform exposure control in a known manner.

If both the switches SW601 and SW602 are found not in their on-states, the flow of operation comes back to the step 812.

Step 816: The motor 615 is driven to rotate forward. This causes the film retaining pad 605 to move to the position to push the surface of the film 602 against the magnetic head 604. Step 817: The film transport driving circuit 702 is caused to drive the transport motor 710 to rotate in the reverse direction. More specifically, one frame portion of the film which has been exposed begins to be rewound. Step 818: The photo-reflector driving circuit 708 is checked to find if a perforation or perforations for one frame have been detected and confirmed. Upon confirmation of it, the rotation of the transport motor 710 is brought to a stop. Further, during the process of this one-frame-portion rewinding action, photographic information such as the photograph date, or the like, relative to this frame is written by the magnetic head 604 into the magnetic storage part of the film 602.

Step 819: Since the information has been written into the photographed frame, the pad driving circuit 707 is caused to drive the motor 615 for a given period of time in such a way as to retract the film retaining pad 605 away from the surface of the film 602. At a step 820: A check is made for completion of photographing on the specified number of frames. If it is found not completed as yet, the flow comes back to the step 812 to repeat the above-stated steps until completion of photographing is confirmed. After confirmation of it, the flow proceeds to a step 821. At the step 821: The film transport driving circuit 702 is caused to reversely rotate the transport motor 710. In other words, the leader part of the remaining portion of film 602 is completely wound back into the cartridge box 601. The sequence of operation steps thus comes to an end.

In the case of this embodiment, the invention is applied to the camera of the kind arranged to first wind up the whole film and then to rewind the film back to the cartridge box every time a shot is completed. In accordance with the arrangement of this embodiment, the film retaining pad 605 is kept in its retracted position, except when information is to be read out or written in by means of the magnetic head 604, such as in reading information on the ISO data, the specified number of frames, etc. or in writing information relative to a photographed frame. The magnetic head 604 is thus normally kept away from the surface of the film 602. The embodiment ensures adequate automatic film loading by preventing the leader part of the film 602 from coming into collision with the magnetic head 604 or with the film retaining pad 605; prevents the performance of the magnetic head from being lowered by adhesion of dust; and also effectively prevents the film surface from being damaged by the magnetic head. Further, since the film 602 and the magnetic head 604 are normally not contacting with each other, a load on film feeding is lessened. Therefore, the film can be wound up at a higher speed and the battery of the camera can be saved from being unnecessarily consumed.

With the invention applied to a camera of the kind using a film which is provided with a magnetic storage part, each of the embodiments described is arranged to ensure adequate automatic film loading; to prevent the performance of the magnetic head from degrading; to prevent the film surface from being damaged by the magnetic head; and to increase the film winding speed and save the battery from being wasted by lessening the load on film feeding.

In the case of embodiments shown in FIGS. 9 to 16, the magnetic head is arranged to be stationary while the pad which is employed as a pushing member is arranged to push the film against the magnetic head by shifting its position to a position where the film travels for the purpose of ensuring adequate reading of information. However, the invention is not limited to this arrangement. The invention is of course applicable also to a camera which is arranged to have the magnetic head movable to and retractable from a position where the film travels.

Further, in the case of embodiments described, the invention is applied to the camera of the kind using the film having the magnetic storage part. However, the invention is of course likewise applicable to a camera of a kind having means for reading or writing information out of or into the storage part of such a film that is provided with a storage medium which differs from the magnetic storage.

What is claimed is:

1. A camera having a shutter release device and being adapted to use a film having a magnetic storage part, said camera comprising:
   a) a magnetic head for at least one of reading information from and writing information to the magnetic storage part of the film, said magnetic head being arranged in a transporting path of the film and performing at least one of reading and writing the information when said magnetic head contacts the film;
   b) release means for releasing the film and said magnetic head from contact, wherein said release means releases the film and said magnetic head at least when a leading edge of the film passes to the position of said magnetic head from a film cartridge; and
   c) allowing means for allowing the film and said magnetic head to come into contact independently of an operation of the shutter release device after the leading edge has passed said magnetic head.

2. A camera according to claim 1, wherein said release means includes determining means for determining whether the film has been wound around a spool positioned to receive the film from the film cartridge.

3. A camera according to claim 2, wherein said determining means includes transport-amount detecting means for detecting an amount of transported portions of the film.

4. A camera according to claim 3, wherein said release means includes means for releasing said magnetic head from contact with the film until said transport-amount detecting means detects a predetermined amount of portions of the film has been transported.

5. A camera according to claim 3, wherein said determining means includes timer means for counting a predetermined length of time after said predetermined amount of portions of the film has been detected by said transport-amount detecting means.

6. A camera according to claim 5, wherein said release means includes means for releasing said magnetic head from the film until said timer means finishes counting the predetermined length of time.

7. A camera according to claim 1, wherein said release means includes means for retracting said magnetic head away from a surface of the film so as to release said magnetic head from contact with the film.

8. A camera according to claim 1, wherein said release means includes pushing means for pushing a surface of the film against said magnetic head, and is arranged to retract said pushing means away from the surface of the film so as to release said magnetic head from contact with the film.

9. A camera according to claim 1, wherein said release means includes a motor arranged to release said magnetic head from contact with the film.

10. A camera according to claim 1, wherein said release means includes an electromagnetic driving member arranged to release said magnetic head from contact with the film.

11. A camera according to claim 1, wherein said release means includes a plunger arranged to release said magnetic head from contact with the film.

12. A camera according to claim 1, further comprising actuating means for bringing said magnetic head into contact with the film for reading or writing information by said magnetic head.

13. A camera according to claim 12, wherein said actuating means comprises film transport means.

14. A camera according to claim 12, wherein said actuating means comprises a motor.

15. A camera according to claim 12, wherein said actuating means comprises an elastic member.

16. A camera according to claim 1, wherein said release means includes deactivating means for rendering said release means inoperative before the transport of the film comes to a stop after the film is wound around a spool positioned to receive the film from the film cartridge.

17. A camera according to claim 1, wherein said release means comprises actuating means for actuating said release means during an exposure.

18. A camera according to claim 1, wherein said release means comprises deactivating means for rendering said release means inoperative during the process of winding one frame portion of the film or during the process of rewinding one frame portion of the film.

19. A camera according to claim 1, wherein said release means comprises activating means for rendering said release means operative during the process of continuous winding or continuous rewinding of the film.

20. A camera according to claim 1, wherein said camera accommodates the film cartridge, which contains the film in its entirety, the film being arranged to be fed to a spool positioned to receive the film from the film cartridge.

21. A camera having a shutter release device and being adapted to use a film having a storage part, said camera comprising:
   a) a head for at least one of reading information from and writing information to the storage part of the film, said head being arranged in a transporting path of the film and performing at least one of reading and writing the information while said head is in contact with the film;
   b) release means for releasing the film and said head from contact, wherein said release means releases the film and said head at least when a leading edge of the film passes to the position of said magnetic head from a film cartridge; and
   c) allowing means for allowing the film and said magnetic head to come into contact independently of an operation of the shutter release device after the leading edge has passed said magnetic head.

22. A camera according to claim 21, wherein said release means includes means for retracting said head away from a surface of the film so as to release said head from contact with the film.

23. A camera according to claim 21, wherein said release means includes pushing means for pushing a surface of a film against said head, and is arranged to retract said pushing means away from the surface of the film so as to release said head from contact with the film.

24. A camera according to claim 21, further comprising actuating means for bringing said head into contact with the film for reading or writing information by said head.

25. A camera according to claim 21, wherein said release means includes deactivating means for rendering said release means inoperative before the transport of the film comes to a stop after the film is wound around a spool positioned to receive the film from the film cartridge.

26. A camera according to claim 21, wherein said release means comprises actuating means for actuating said release means during the process of an exposure.

27. A camera according to claim 21, wherein said release means comprises deactivating means for rendering said release means inoperative during the process of winding one frame portion of the film or during the process of rewinding one frame portion of the film.

28. A camera according to claim 21, wherein said release means comprises activating means for rendering said release means operative during the process of continuous winding or continuous rewinding of the film.

29. A magnetic-storage-part information transmitting device for a camera having a shutter release device and being adapted to use a film having a magnetic storage part, said information transmitting device comprising:
   a) a magnetic head for at least one of reading information from and writing information to the magnetic storage part of the film, said magnetic head being arranged in a transporting path of the film and performing at least one of reading and writing the information when said magnetic head contacts the film;
   b) release means for releasing the film and said magnetic head from contact, wherein said release means releases the film and said magnetic head at least when a leading edge of the film passes to the position of said magnetic head from a film cartridge; and
   c) allowing means for allowing the film and said magnetic head to come into contact independently of an operation of the shutter release device after the leading edge has passed said magnetic head.

30. An information-storage-part information transmitting device for a camera having a shutter release device and being adapted to use a film having an information storage part, said information transmitting device comprising:
   a) a head for at least one of reading information from and writing information to the storage part of the film, said head being arranged in a transporting path of the film and performing at least one of reading and writing the information while said head is in contact with the film;
   b) release means for releasing the film and said head from contact, wherein said release means releases the film and said head at least when a leading edge of the film passes to the position of said magnetic head from a film cartridge; and
   c) allowing means for allowing the film and said magnetic head to come into contact independently of an operation of the shutter release device after the leading edge has passed said magnetic head.

31. An apparatus having a shutter release device and being adapted to use a film having a magnetic storage part, said apparatus comprising:
   a) a magnetic head for at least one of reading information from and writing information to the magnetic storage part of the film, and
   b) bringing means for bringing a relation between said magnetic head and the film into a state where said magnetic head performs said at least one of reading information from and writing information to the magnetic storage part of the film independently of an operation of the shutter release device.

32. An apparatus according to claim 31, wherein said bringing means comprises means for operating when the film is transported.

33. An apparatus according to claim 31, wherein said bringing means comprises means for operating when automatic loading of the film is performed.

34. An apparatus according to claim 31, wherein said bringing means comprises means for operating when said magnetic head is used.

35. An apparatus according to claim 31, wherein said apparatus comprises a camera.

36. An apparatus according to claim 31, wherein said release means comprises determining means for determining whether the film has been wound around a spool positioned to receive the film from a film cartridge.

37. An apparatus according to claim 36, wherein said determining means comprises transport-amount detecting means for detecting a predetermined amount of transported portions of the film.

38. An apparatus according to claim 37 wherein said bringing means comprises means for operating after said transport-amount detecting means detects that the predetermined amount of transported portions of the film has been transported.

39. An apparatus according to claim 37, wherein said determining means comprises timer means for counting a predetermined length of time after the predetermined amount of transported portions of the film has been detected by said transport-amount detecting means.

40. An apparatus according to claim 39, wherein said bringing means comprises means for operating after said timer means finishes counting the predetermined length of time.

41. An apparatus according to claim 31, wherein said bringing means comprises means for moving said magnetic head to a surface of the film.

42. An apparatus according to claim 31, wherein said bringing means comprises pushing means for pushing a surface of the film against said magnetic head.

43. An apparatus according to claim 31, wherein said bringing means comprises a motor.

44. An apparatus according to claim 31, wherein said bringing means comprises an electromagnetic driving member.

45. An apparatus according to claim 31, wherein said release means comprises a plunger.

46. An apparatus according to claim 31, further comprising means for accommodating a film cartridge, which contains the film in its entirety, the film being arranged to be fed to a spool positioned to receive the film from the film cartridge.

47. An apparatus according to claim 31, wherein said bringing means comprises means for operating when the film is continuously transported.

48. An apparatus having a shutter release device and being adapted to use a film having a storage part, said apparatus comprising:
   a) a head for at least one of reading information from and writing information to the storage part of the film, and
   b) bringing means for bringing a relation between said head and the film into a state where said head performs said at least one of reading information from and writing information to the storage part of the film independently of an operation of the shutter release device.

49. An apparatus according to claim 48, wherein said bringing means comprises means for operating when the film is transported.

50. An apparatus according to claim 48, wherein said bringing means comprises means for operating when automatic loading of the film is performed.

51. An apparatus according to claim 48, wherein said bringing means comprises means for operating when said head is used.

52. An apparatus according to claim 48, wherein said apparatus comprises a camera.

53. An apparatus according to claim 48, wherein said release means comprises determining means for determining whether the film has been wound around a spool positioned to receive the film from a film cartridge.

54. An apparatus according to claim 53, wherein said determining means comprises transport-amount detecting means for detecting a predetermined amount of transported portions of the film.

55. An apparatus according to claim 54 wherein said bringing means comprises means for operating after said transport-amount detecting means detects that a predetermined amount of transported portions of the film has been transported.

56. An apparatus according to claim 54, wherein said determining means comprises timer means for counting a predetermined length of time after said predetermined amount of transported portions of the film has been detected by said transport-amount detecting means.

57. An apparatus according to claim 56, wherein said bringing means comprises means for operating after said timer means finishes counting the predetermined length of time.

58. An apparatus according to claim 48, wherein said bringing means comprises means for moving said head to a surface of the film.

59. An apparatus according to claim 48, wherein said bringing means comprises pushing means for pushing a surface of the film against said head.

60. An apparatus according to claim 48, wherein said bringing means comprises a motor.

61. An apparatus according to claim 48, wherein said bringing means comprises an electromagnetic driving member.

62. An apparatus according to claim 48, wherein said release means comprises a plunger.

63. An apparatus according to claim 48, further comprising means for accommodating a film cartridge, which contains the film in its entirety, the film being arranged to be fed to a spool positioned to receive the film from the film cartridge.

64. An apparatus according to claim 48, wherein said bringing means comprises means for operating when the film is continuously transported.

* * * * *

UNITED STATES PATENT AND TRADEMARK OFFICE
CERTIFICATE OF CORRECTION

PATENT NO. : 5,572,268    Page 1 of 2
DATED : November 5, 1996
INVENTOR(S) : HIDEO TAMAMURA It is certified that error appears in the above-indentified patent and that said Letters Patent is hereby corrected as shown below:

Title page
AT [75] INVENTOR

Line 1, "Kanagawa-ken," should read --Yokohama,--.

COLUMN 1

Line 29, "affecting" should read --effecting--.
    Line 41, "surface," should read --surface, and--.
    Line 43, "to be" should read --is--.
    Line 55, "the" should read --a--, and "a" should read --the--.

COLUMN 5

Line 9, "of" should be deleted.
    Line 12, "it" should read --it as--.

COLUMN 7

Line 29, "to-the" should read --to the--.

COLUMN 13

Line 60, "film," should read --film;--.

COLUMN 14

Line 57, "film," should read --film;--.

UNITED STATES PATENT AND TRADEMARK OFFICE
CERTIFICATE OF CORRECTION

PATENT NO. : 5,572,268

DATED : November 5, 1996

INVENTOR(S) : HIDEO TAMAMURA

It is certified that error appears in the above-indentified patent and that said Letters Patent is hereby corrected as shown below:

In the Drawings:

SHEET 8

Fig. 10, "PHOTO-REFLETOR" should read --PHOTO-REFLECTOR--.

SHEET 10

Figure 13:
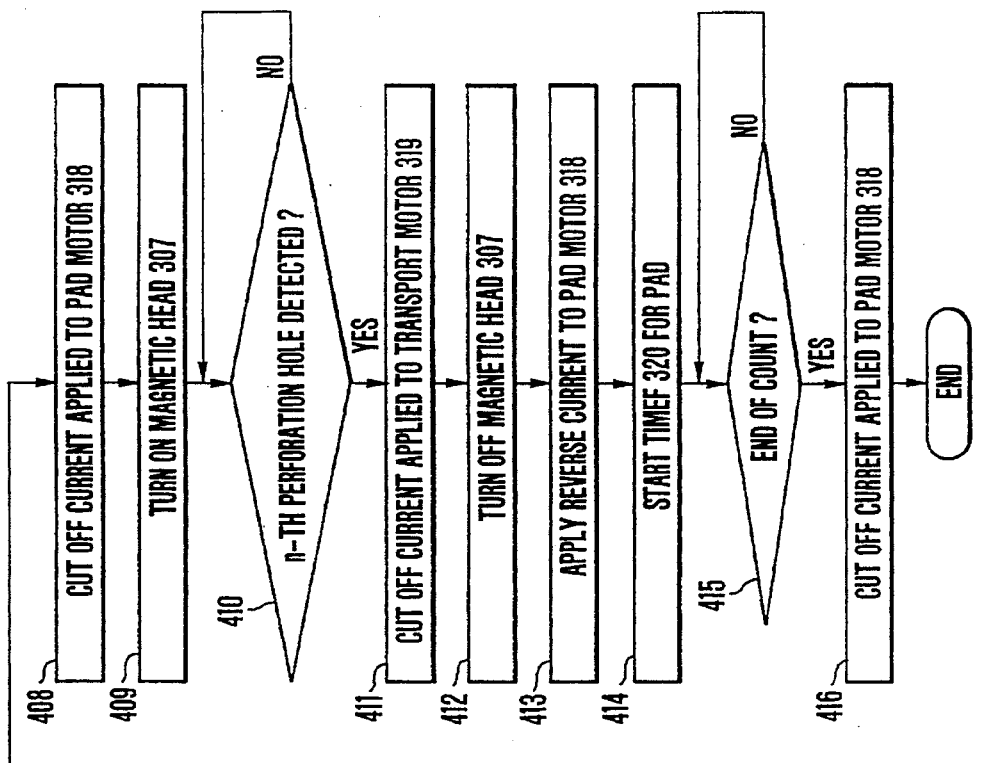
FIG. 13 is a flow chart showing the operation of the camera of FIG. 12.
Figure 13:
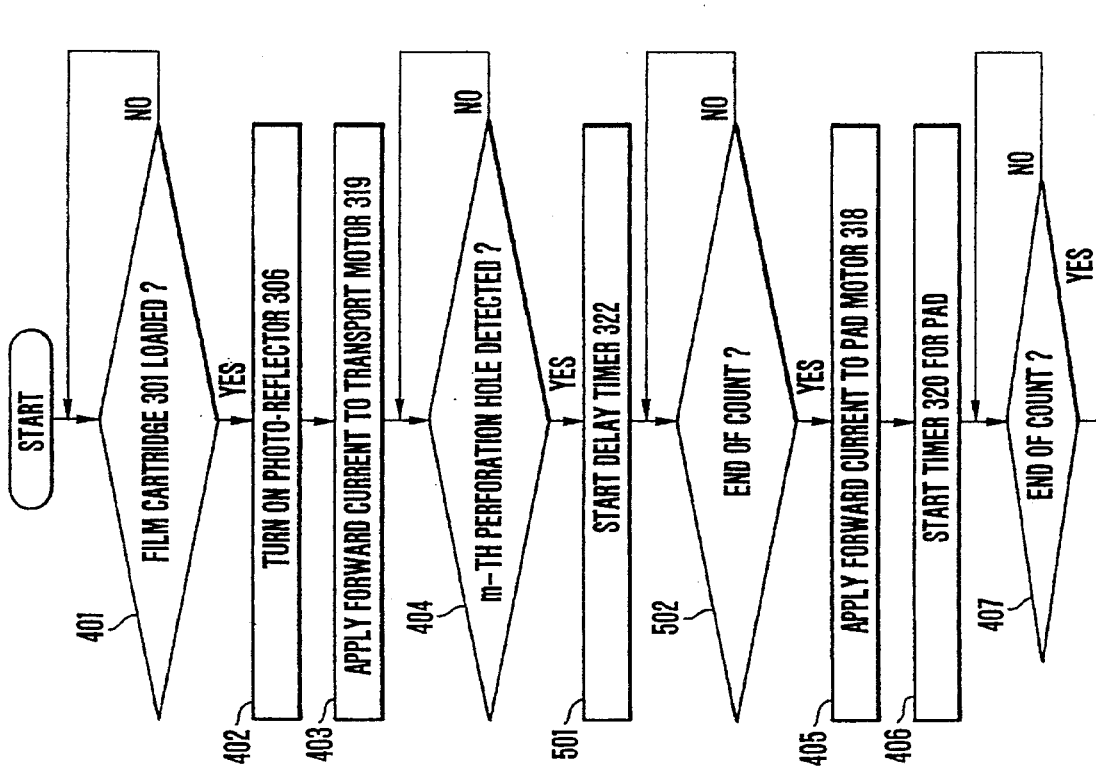

Fig. 13, "TIMEF" should read --TIMER--.

Signed and Sealed this

Sixth Day of May, 1997

Attest:

Attesting Officer

BRUCE LEHMAN
Commissioner of Patents and Trademarks